United States Patent [19]

Ito et al.

[11] Patent Number: 4,778,345
[45] Date of Patent: Oct. 18, 1988

[54] TURBINE ROTOR

[75] Inventors: Masaya Ito; Noboru Ishida; Mitsuyoshi Kawamura, all of Nagoya, Japan

[73] Assignee: NGK Spark Plug Co., Ltd., Nagoya, Japan

[21] Appl. No.: 839,664

[22] Filed: Mar. 14, 1986

Related U.S. Application Data

[63] Continuation-in-part of Ser. No. 39,602, Feb. 18, 1986.

[30] Foreign Application Priority Data

Mar. 15, 1985 [JP] Japan ................... 60-52851

[51] Int. Cl.$^4$ ............... F04D 29/02; F16C 3/00
[52] U.S. Cl. ............... 416/241 B; 416/213 R; 228/124; 228/231; 148/144
[58] Field of Search .......... 416/241 B, 241 R, 244 A, 416/213 R; 228/122, 124, 135, 231; 417/407; 415/212, 214; 148/144, 145; 29/156.8 R

[56] References Cited

U.S. PATENT DOCUMENTS

| 3,834,833 | 9/1974 | Faber et al. | 416/241 R |
|---|---|---|---|
| 3,839,779 | 10/1974 | Walker | 228/122 |
| 4,090,813 | 5/1978 | Minato et al. | 416/241 R |
| 4,142,923 | 3/1979 | Satava | 148/144 X |
| 4,335,998 | 6/1982 | Siebels | 416/241 B X |
| 4,557,704 | 12/1985 | Ito et al. | 415/214 X |
| 4,614,453 | 9/1986 | Tsuno et al. | 416/244 A X |

FOREIGN PATENT DOCUMENTS 2734747  2/1979  Fed. Rep. of Germany ... 416/213 R
61-286274 12/1986  Japan .

Primary Examiner—Robert E. Garrett
Assistant Examiner—Joseph M. Pitko
Attorney, Agent, or Firm—Wegner & Bretschneider

[57] ABSTRACT

In a turbine rotor composed of a ceramic turbine blade and a metal shaft with an end to be machined, martensite stainless steel or martensite heat-resistant steel which can be hardened in a gas or vacuum after having been heated beyond the quenching temperature thereof is used as the metal. The ceramic blade and the metal shaft are heat-connected by brazing or shrinkage fit at 800° C., or more. The metal shaft hardened through the heat-connection is tempered only at the end to be machined or the metal shaft heated to the quenching temperature is quench hardened only in part other than the end to be machined, thus facilitating the machining of the metal shaft locally which keeping the remaining part thereof in a quench hardened condition.

12 Claims, 2 Drawing Sheets

TURBINE ROTOR

Reference to the earlier application: This application is a continuation-in-part application of the earlier U.S. patent application Ser. No. 039,602 (attorney's docket No. BEB-19486) entitled Metal and Ceramic Heat-Connected Body filed on Feb. 18, 1986 by the same applicants.

BACKGROUND OF THE INVENTION

The present invention relates to a turbine rotor of a turbo charger in which high heat resistance is required for the turbine blades and high strength and high abrasion resistance are required for the slide bearing shaft.

Ceramic material is small in specific gravity and excellent in heat resistance as compared with metal. Therefore, there have been proposed various turbine rotor structures such that the blades are made of ceramics and the bearing shaft at which strength is required is made of metal, and subsequently the rear surface of hub of the ceramic blade wheel and one end of the metal shaft are heat-connected to each other by brazing, pressure fit, shrinkage fit, etc. Here, the above "heat connect" generally implies that two members are connected or joined by application of heat at 800° C. or more.

DISCUSSION OF THE PRIOR ART

In the high-temperature heat-connection between ceramics and metal, however, since metal shaft is readily annealed through the heat-connection process, the metal shaft is not provided with sufficient abrasion resistance, thus a problem arises in that the slide bearing portion of the shaft easily wears off during operation. To overcome this problem, it is usually necessary to harden the metal shaft through heat treatment process after the metal shaft has been connected with the ceramic blade wheel. In this process, however, when the treating temperature is too high, cracks may be produced in ceramics because of internal stress caused by thermal strain after the heat treatment. In particular, in the case of quench hardening treatment as the oil or water quenching process, since the above internal stress is great, there exists a problem such that the ceramics may be broken at the worst. On the other hand, when the treatment temperature is set to a low temperature, another problem arises such that it is impossible to obtain sufficient metal hardness of $H_{RC}$ 40 or more in the slide bearing portion of the shaft. In addition, since there exists a big difference in the thermal expansion coefficient between metal and ceramics, stress strain usually remains at the connected portion due to the coefficient difference between the two, thus deteriorating durability at the connected portion of the turbine rotor.

SUMMARY OF THE DISCLOSURE

The primary object of the present invention is to solve the above-mentioned problem involved in the prior art turbine rotor. Further, it is another object of the present invention to provide a turbine rotor in which ceramic blade wheels and the metal shaft of high hardness are strongly heat-connected to each other.

The basic concept of the present invention is based upon the following points:

(1) connecting temperature of the ceramic blade wheel and the metal shaft of a turbine rotor is high;

(2) martensite type heat-resistant steel and martensite type stainless steel are typically by about 0.5 vol % expanded due to martensite transformation at the cooling of the quench hardening process; and (3) there exist some metals which can be hardened even by cooling in a gas or vacuum atmosphere among various martensite type heat-resistant steels and martensite type stainless steels.

Further, the present invention is a practical application of Japanese Patent Appication No. 60-29685 entitled "Metal and Ceramics Heat-Connected Body" and filed on Feb. 18, 1985 by the same applicants based on which priority a U.S. application Ser. No. 039,602 was filed on Feb. 18, 1986, the disclosure thereof being incorporated herein by reference.

In a ceramic turbine rotor including a ceramic blade wheel and a metal shaft with an end to be machined, according to the present invention, the metal shaft is made of martensite type heat-resistant steel or martensite type stainless steel which can be quench hardened in a gas or vacuum after having been heated beyond a quench hardening temperature thereof to heat-connect the metal shaft with the ceramic blade wheel; and the metal shaft quench hardened upon being heat-connected with the ceramic member is tempered only at the end to be machined while keeping part of the metal shaft other than the end to be machined in a hardened state. Or else, in the other aspect of the present invention, the metal shaft is made of the same steel; and the metal shaft is quench hardened when heat-connected with the ceramic blade wheel only in part of the metal shaft other than the end to be machined without hardening the end to be machined.

Therefore, it is possible to provide a composite turbine rotor in which the metal shaft is strongly connected to the ceramic blade wheel and additionally the slide bearing portion of the metal shaft is excellent in abrasion resistance. In the manufacturing process of the present invention, since the heat connection and metal hardening can be achieved simultaneously, it is possible to reduce labor markedly.

In the present invention, since the heat-connecting temperature (800° C. or more) is equivalent or higher than the quench hardening temperature (generally about 700° to about 1100° C.) of the metal concerned and further the heat-connected metal can be hardened within a gas or vacuum atmosphere, the metal shaft is simultaneously heated over a predetermined axial length above the quench hardening temperature and then cooled for hardening the metal during the same heating and cooling process for connecting the metal shaft with the ceramic blade wheel. Further, the metal shaft is made of one of martensite type heat-resistant steel or martensite type stainless steel and therefore the metal shaft is typically by 0.5 vol % expanded due to martensite transformation during the cooling process. Therefore, it is possible to reduce stress strain caused by the difference in the thermal expansion coefficient between the metal and ceramics at the connected portion thereof. Subsequently, only an end remote from the heat-connected end of the metal shaft connected to the ceramic blade wheel is heated locally and then tempered or kept so as not to be hardened from the beginning. Therefore, it is possible to easily machine (e.g., cut, thread, etc.) the end remote from the heat-connected end of the metal shaft in order to fix a compressor wheel thereto. Further, the shaft of the turbine rotor tends to be heated to a very high temperature in heat soak back operation. In order to prevent the slide bearing portion of the metal shaft from being tempered to soft metal during operation, it is preferred to select a material having tempering temperature of 500° C. or more from among the above-mentioned metals in the case where the turbine rotor is operated at a high temperature.

In the present invention, martensite stainless steels or martensite heat-resistant steels, which can be hardened within a gas or vacuum after having been heated above the quench hardening temperature, are used as the metal to be heat-connected to ceramics. Here, heat-connection implies all the methods such as brazing, shrinkage fit and the like connecting or jointing techniques in which at least the connected end of metal is connected to ceramics at a high temperature of 800° C. or higher. It is preferred that the martensite phase constitutes a major phase in the hardened metal, e.g., at least 50 vol % (more preferably 80 vol %) of the entire metal.

Further, the connected metal which is one of martensite stainless steels or matensite heat-resistant steels is by at least 0.02% (preferably at least 0.1%, and most preferably, at least 0.5%) expanded due to martensite transformation during the cooling process, which contributes to reduce stress strain.

As the metals to be used for the present invention, it is possible to give an example of martensite heat-resistant steel such as SUH-616 steel, SUH-600 steel, etc. which includes 0.02 to 3 wt& % of at least one element selected from Mo, W and V, or of martensite stainless steel such as SUS-440, SUS-420, SUS-403, AISI-618, etc. which includes a relatively high content of carbon e.g., about 0.1—about 1.5 wt %. In those metals, the hardness HRC becomes sufficiently high so as to assure excellent wear resistance, i.e., 40 or more (preferably 45 or more, most preferably 50 or more) through the heat-connection of the present invention and the tempering temperature is 500° C. or higher. However, without being limited to those metals hereinabove specifically mentioned, the martensite stainless steels or martensite heat-resistant steels which can be quench hardened wihtin the predetermined temperature range are applicable to the present invention. The above temperature range is preliminarily determined by measuring a range within which atmosphere for heat-connection is controllable. Further, the metal applied to the present invention is not limited to the examplified additive elements or the amounts thereof.

The quench hardening can be effected during the cooling procedure immediately following the heat-connection at the high temperature defined to each of the metal connected. A suitable cooling rate for respective metal connected should be maintained during the cooling procedure, e.g., at least 10° C./min (preferably at least 30° C./min) during the temperature range where the transformation from austenite to martensite (herein referred to as martensite transformation) occurs. The martensite transformation temperature range depends greatly upon the type of steel and the cooling rate itself, thus such range should be determined by a preliminary testing. The quench hardening temperature range of the metal is defined so as to provide the hardened HRC of at least 40 which is sufficient to provide excellent wear resistance. Accordingly the quench hardening temperatures of the present invention for the respective metals may be slightly lower than those as specified in the known standard quench hardening temperature (e.g., appearing in JIS or "Kinzoku [=Metal] Data Book", 1974 edited by Japan Institute of Metallurgy, page 117, Table 5.2 2, a copy thereof will be submitted for reference). In the present invention the heating temperature for the quench hardening may be as follows:

| metal | present invention | standard quenching |
|---|---|---|
| SUS-420 J2 | ≧ 880° C. air* | 1000–1050° C. oil** |
| SUS-440 | ≧ 900° C. air | 1010–1070° C. oil |
| SUS-600 | ≧ 900° C. air | 1020–1070° C. oil |
| SUS-616 | ≧ 900° C. air | 1020–1070° C. oil |

*air cooling
**oil quenching

It should be noted that combination of brazing and shrinkage fit may be employed as shown in FIG. 4A and FIG. 4B, wherein the numerals 3 and 6 indicate brazing and shrinkage fit, respectively, and the numeral 7 indicates clearance. Heating can be made at one time for both while heating in two times may be effected, too. This combination of heat-connection provides a more stable and secure connection.

The ceramics applicable in the present invention embrace heat resistant ceramics such as silicon nitride ($Si_3N_4$, thermal expansion coefficient $\alpha$ of $3.0 \times 10^{-6}$/°C. within a temperature range between room temperature R.T. and 1000° C.), a silicon carbide (SiC $\alpha = 4.6 \times 10^{-6}$/°C. between R.T. and 1200° C.), and alumina ($\alpha = 8.0 \times 10^{-6}$/°C. between R.T. and 900° C.). Other ceramics having similar properties may be employed in the present invention.

Brazing joint may be applied as the heat-connection wherein brazes should have a brazing temperature of at least 800° C. (preferably not exceeding 1200° C., more preferably 900°–1170° C.). The shrinkage fit temperature of the metal should be at least 800° C. (preferably not exceeding 1200° C., more preferably 900°–1170° C.). In summary the heat-connection should be effected at a temperature within the temperature range of 800°–1200° C. (more preferably 900°–1170° C.).

The brazes applicable in the braze joint are set forth below:

| braze | brazing temperature(°C.) |
|---|---|
| pure Ag | 1000 |
| 80Ni—15Cr—5B | 1065-1205 |
| 89Ni—11P | 925-1095 |
| 70Ni—30Ti | 950-1200 |
| 72Ag—28Cu eutectic | 780-900 |
| 50Cu—50Ti | 900-1050 |

(composition by weight %)

In the following preferred embodiments of the present invention will be described in more detail with reference to the accompanying drawings.

BRIEF DESCRIPTION OF THE DRAWINGS

FIGS. 4A and 4B are cross-sectinal partial views showing still other embodiments of the present invention.

DETAILED DESCRIPTION OF THE PREFERRED EMBODIMENTS

Example 1

Figure 1:
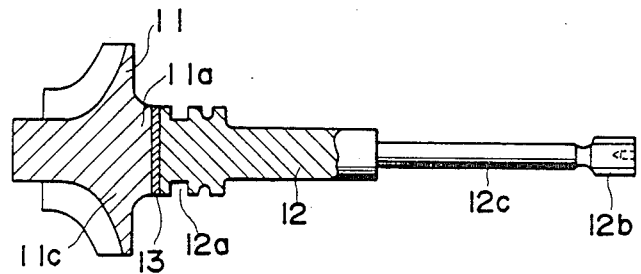
FIG. 1 is a cross-sectional view showing an embodiment according to the present invention, which is applied to a turbine rotor.

FIG. 1 is a cross-sectional view showing an embodiment of the heat-connected turbine rotor according to the present invention. The reference numeral 11 denotes a ceramic blade wheel (the external dia. is 60 mm) made of silicon nitride sintered body with a thermal expansion coefficient of $3.0 \times 10^{-6}/°C$. (R.T. to 1000° C.). The blade wheel 11 was formed with a blade wheel axle 11a (the dia. is 60 mm) projectingly provided on the rear surface of a hub portion (the dia. is 30 mm) integral with the blade wheel, in order to connect the blade wheel 11 to a metal shaft operatively connected with a compressor wheel (not shown). The numeral 12 denotes a metal shaft (the dia. is 10 mm) made of SUH-616 for operatively connecting the ceramic blade wheel 11 with the compressor wheel. A seal ring groove 12a was formed in the metal shaft 12 on one end portion thereof near the blade wheel, and a threaded portion 12b was formed in the metal shaft 12 on the other end portion thereof in order to screw-fastening the compressor wheel thereto. The numeral 13 denotes a brazing material Ni-Ti (70Ni-30Ti by wt %) for connecting the blade wheel 11 and the metal shaft 12. The turbine rotor as described above was manufactured by heat-connecting the blade wheel 11 to the metal shaft 12 with the Ni-Ti brazing metal 13 on the end surface of the blade wheel axle 11a of the blade wheel 11 at a temperature of 1020° C. in vacuum of $10^{-6}$ Torr, lowering the temperature to room temperature at a cooling rate of 60° C./min, and thereafter heating the non-heat-connected portion (the length is about 20 mm) of the metal shaft 12 remote from the blade wheel 11 to a temperature of 600° C. for 10 minutes with a burner and subsequently cooling it in the air for tempering. The turbine rotor obtained in accordance with the above heat treatment process is threaded only in the tempered portion by the lathe, finished in the remaining portion, and balanced in rotational moment. The hardness of the metal shaft 12 was $H_{RC}=52$ at the non-tempered portion and $H_{RC}=32$ at the tempered portion. The turbine rotor manufactured as described above was assembled in a turbo charger. The turbo charger was mounted on a test 6-cylinder in-line gasoline engine with a combustion chamber volume of 2000 cc. As a result of a durability test for 500 hours at a gas temperature of 900° C. at a rotational speed of 100,000 rpm, it was confirmed that the wear was 1 micrometer or less at the slide bearing portion. Further, the tensile strength of the heat-connected portion between the ceramic blade wheel 11 and the metal shaft 12 was 20 kg/mm² (at room temperature).

Example 2

Figure 2:
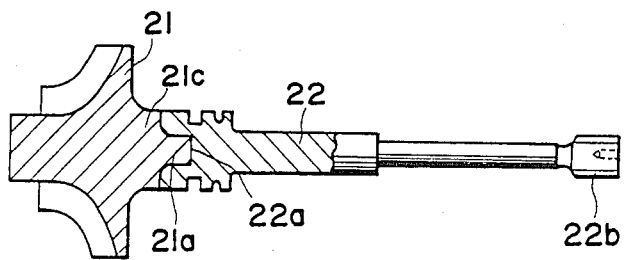
FIGS. 2 and 3 are cross-sectional views showing another embodiments of the present invention, respectively.

FIG. 2 is a cross-sectional view showing another embodiment of the heat-connected turbine rotor according to the present invention. The reference numeral 21 denotes a ceramic blade wheel (the external dia. is the same as in the first embodiment) made of silicon nitride sintered body with a thermal expansion coefficient of $3.0 \times 10^{-6}/°C$. (R.T. to 1000° C.). The blade wheel 21 was formed with a blade wheel axle 21a projectingly provided on the rear surface of a hub portion integral with the blade wheel, in order to connect the blade wheel 21 to a metal shaft operatively conencted with a compressor wheel (not shown). The numeral 22 denotes a metal shaft made of SUH-16 for operatively connecting the ceramic blade wheel 21 with the compressor wheel. A bore 22a was formed in the end surface of the metal shaft 22 on the blade wheel side in order to heat connect the blade wheel axle 21a to the bore 22a by shrinkage fitting, and a threaded portion 22b was formed in the metal shaft 22 on the other end thereof in order to screw-fastening the compressor wheel thereto. The turbine rotor as described above was manufactured by heating the ceramic blade wheel 21 and the metal axle 22 to temperature 1100° C., shrinkage-fitting the two with a fitting overlap dimension of 90 micromeer, lowering the temperature to room temperature at a cooling rate of 65° C./min, and thereafter heating the non-heat-connected portion of the metal shaft 22 remote from the blade wheel 11 to a temperature of 600° C. for 10 minutes with a burner and subsequently cooling it in the air for tempering. The turbine rotor obtained in accordance with the above heat treatment process is threaded only in the tempered portion by a lathe, finished in the remaining portion, and balanced in rotational moment. The hardness of the metal shaft 22 was $H_{RC}=47$ at the non-tempered portion and $H_{RC}=29$ at the tempered portion. The turbine rotor manufactured as described above was assembled in a turbo charger. The turbo charger was mounted on a test engine the same as in the first example. As a result of a run-stop (run for 300 sec and stop for 300 sec) cycle test of 1000 times at a gas temperature of 900° C. at a rotational speed of 100,000 rpm, it was confirmed that there was no wear at the slide bearing portion and no damage in the ceramics near the heat-connected (shrinkage fit) portion.

Example 3

A turbine rotor was manufactured under the same conditions as in Example 1 described with reference to FIG. 1 except that the righthand half 12c inclusive of the threaded portion 12b of the metal shaft 12 was held outside the heat-connecting atmosphere; the heat-connecting atmosphere was argon; only the non-heat-connected end portion of the metal shaft 12 was gradually cooled (the cooling rate was 2° C./min) down to room temperature by blowing hot air thereonto so as not to be hardened when the metal shaft 12 was cooled after heat connection; and the non-heat-connected end was threaded without tempering. The hardness of the portion was $H_{RC}=39$.

Example 4

Figure 3:
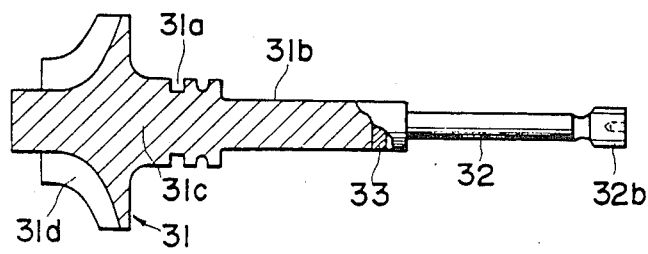

FIG. 3 is a cross-sectional view showing a further embodiment of the turbine rotor according to the present invention.

The numeral 31 denotes a ceramic blade wheel. In this embodiment, a blade wheel axle 31b extends from a hub portion 31c of the blade wheel beyond a slide bearing portion 31a integral with a blade wheel portion 31d. The numeral 32 denotes a metal shaft heat-connected with the ceramic blade wheel 31 via a Ni-Ti brazing material 33 placed at one end thereof and formed with a threaded portion 32b at the other end thereof.

Example 5

Figure 4A:
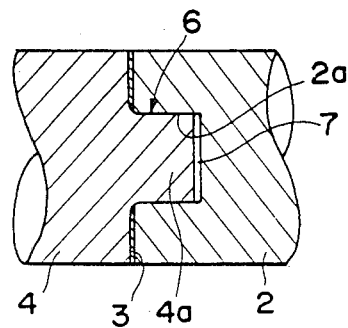
FIGS. 4A and 4B are cross-sectional views showing further embodiments of the present invention.
Figure 4B:
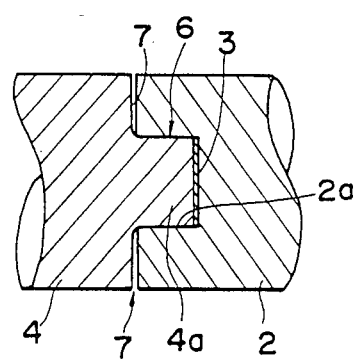

FIGS. 4A and 4B shows cross-sectional views of other embodiments of the present invention.

A cylindrical projection 4a is formed at the end surface of the blade wheel axle or the hub portion 4 of the ceramic blade wheel. An axial bore 2a is formed at the end portion of the metal shaft end 2. Therefore, the cylindrical projection 4a of the ceramic blade wheel is shrinkage-fitted into the axial pore 2a of the metal shaft end 2.

In addition to the shrinkage-fitting as described above, the ceramic blade wheel and the metal shaft are further connected by brazing. In the case of FIG. 4A, a brazing material 3 is put at the shoulder portion of the end surface of the hub portion 4 or at the end surface of the metal shaft end 2 except the axial bore 2a so as to provide a clearance between the top end of the projection 4a and the bottom end of the axial bore 2a. In the case of FIG. 4B, a brazing material 3 is put on the top end of the projection 4a or in the bottom end of the axial bore 2a so as to provide a clearance 7 between the shoulder portion of the hub portion 4 and the end surface of the metal shaft end 2. It is preferred to perform the shrinkage fitting 6 and the brazing 3 at the same time; however, it is also possible to perform the above two processes separately.

What is claimed is:

1. A turbine rotor including a ceramic member and a metal shaft member with an end to be machined, wherein the metal member is made of any one of martensite heat-resistant steel and martensite stainless steel which is quench hardened in a gas or vacuum after having been heated beyond a quench hardening temperature thereof to heat-connect the metal shaft member with the ceramic member, the metal shaft member quench hardened when heat-connected with the ceramic member having been tempered only at the end to be machined while keeping part of the metal shaft member other than the end to be machined in a hardened state.

2. The turbine rotor as set forth in claim 1, wherein the heat-connection is brazing and/or shrinkage fit.

3. The turbine rotor as set forth in claim 2, wherein the brazing and/or shrinkage fit are/is effected in dependence upon a connecting portion of the ceramic member and a corresponding connecting portion of the metal shaft member enclosing or surrounding the ceramic member connecting portion.

4. The turbine rotor as set forth in claim 1, wherein the quench hardening of the metal shaft member occurs due to martensite transformation.

5. The turbine rotor as set forth in claim 4, wherein the metal shaft is capable of expanding by at least 0.02 vol % through the martensite transformation during the cooling process.

6. The turbine rotor as set forth in claim 1, wherein the metal shaft member has been quench hardened to a hardness $H_{RC}$ of at least 40.

7. A turbine rotor including a ceramic member and a metal shft member with an end to be machined, wherein the metal member is made of any one of martensite heat-resistant steel and martensite stainless steel which is quench hardened in a gas or vacuum after having been heated beyond a quench hardening temperature thereof to heat-connect the metal shaft member with the ceramic member, the metal shaft member having been quench hardened when heat-connected with the ceramic member only in part of the metal shaft member other than the end to be machined without hardening the end to be machined.

8. The turbine rotor as set forth in claim 7, wherein the heat-connection is brazing and/or shrinkage fit.

9. The turbine rotor as set forth in claim 8, wherein the brazing and/or shrinkage fit are/is effected in dependence upon a connecting portion of the ceramic member and a corresponding connecting portion of the meatl shaft member enclosing or surrounding the ceramic member connecting portion.

10. The turbine rotor as set forth in claim 7, wherein the quench hardening of the metal shft member occurs due to martensite transformation.

11. The turbine rotor as set forth in claim 10, wherein the metal shaft member is capable of expanding by at least 0.02 vol % through the martensite transformation during the cooling process.

12. The turbine rotor as set forth in claim 7, wherein the metal shaft member is quench hardened to a hardness $H_{RC}$ of at least 40.

* * * * *